US009220109B2

(12) United States Patent
Calvanese Strinati et al.

(10) Patent No.: US 9,220,109 B2
(45) Date of Patent: Dec. 22, 2015

(54) METHOD FOR MODIFYING THE STATE OF LOCAL ACCESS POINTS IN A CELLULAR NETWORK

(71) Applicant: COMMISSARIAT A L'ENERGIE ATOMIQUE ET AUX ENE ALT, Paris (FR)

(72) Inventors: Emilio Calvanese Strinati, Grenoble (FR); Antonio De Domenico, Grenoble (FR); Jessica Oueis, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 33 days.

(21) Appl. No.: 14/168,449

(22) Filed: Jan. 30, 2014

(65) Prior Publication Data
US 2014/0220994 A1    Aug. 7, 2014

(30) Foreign Application Priority Data

Feb. 4, 2013    (FR) ...................................... 13 50947

(51) Int. Cl.
*H04M 1/00*    (2006.01)
*H04B 1/38*    (2015.01)
(Continued)

(52) U.S. Cl.
CPC ...... *H04W 72/0486* (2013.01); *H04W 52/0206* (2013.01); *H04W 52/0258* (2013.01); *Y02B 60/50* (2013.01)

(58) Field of Classification Search
CPC .................... H04W 52/0206; H04W 72/0486; H04W 52/0212; H04W 52/0216; H04W 52/0219; H04W 52/0225; H04W 52/0235; H04W 52/0261; H04W 88/08; Y02B 60/50

USPC ............... 455/574, 13.4, 127.1, 127.5, 343.1, 455/343.2, 452.1, 561, 572; 370/311, 318
See application file for complete search history.

(56) References Cited

U.S. PATENT DOCUMENTS 8,111,624 B2    2/2012    Strinati
8,301,966 B2    10/2012   Strinati et al.
(Continued)

FOREIGN PATENT DOCUMENTS

FR        2 964 290 A1    3/2012

OTHER PUBLICATIONS

L. Saker, et al. "Optimal Control of Wake Up Mechanisms of Femtocells in Heterogeneous Networks" IEEE Journal on Selected Areas in Communication, vol. 30, No. 3, Apr. 2012, pp. 664-672.
(Continued)

*Primary Examiner* — Rafael Pérez-Gutiérrez
*Assistant Examiner* — Mark G. Pannell
(74) *Attorney, Agent, or Firm* — Oblon, McClelland, Maier & Neustadt, L.L.P.

(57) ABSTRACT

A method of allocating resources in a cellular radio communication network including user equipments and a cluster composed of local access points to the network covering a microcell. For each local access point, the presence of user equipments in a coverage zone of the microcell associated with the local access point is determined. A local coverage message specifying equipments determined as present in the microcell coverage zone is generated. A global coverage message by aggregation of the local coverage message of each local access point in the cluster is generated. At least one operating parameter of a local access point in the cluster is modified as a function of the global coverage message. For each local access point in the cluster, an activity state of the user equipment is determined and a field in the local coverage message is entered accordingly with data representing the activity of the equipment.

11 Claims, 2 Drawing Sheets

(51) Int. Cl.
*H04W 72/04* (2009.01)
*H04W 52/02* (2009.01)

(56) References Cited

U.S. PATENT DOCUMENTS

| | | | |
|---|---|---|---|
| 8,504,010 B2 | 8/2013 | Abgrall et al. | |
| 8,537,801 B2 | 9/2013 | Strinati et al. | |
| 8,626,229 B2 | 1/2014 | Abgrall et al. | |
| 8,630,675 B2 | 1/2014 | Strinati | |
| 8,645,805 B2 | 2/2014 | Strinati | |
| 8,649,273 B2 | 2/2014 | Ktenas et al. | |
| 8,755,273 B2 | 6/2014 | Strinati | |
| 8,787,345 B2 | 7/2014 | Corbellini et al. | |
| 2004/0196802 A1* | 10/2004 | Bae et al. | 370/328 |
| 2007/0026887 A1* | 2/2007 | Voyer et al. | 455/525 |
| 2008/0020702 A1* | 1/2008 | Jendbro et al. | 455/3.01 |
| 2008/0039089 A1* | 2/2008 | Berkman et al. | 455/436 |
| 2008/0096597 A1* | 4/2008 | Vempati et al. | 455/518 |
| 2009/0098885 A1* | 4/2009 | Gogic et al. | 455/456.1 |
| 2009/0252172 A1 | 10/2009 | Hare | |
| 2010/0061321 A1 | 3/2010 | Strinati et al. | |
| 2011/0013584 A1 | 1/2011 | Strinati et al. | |
| 2011/0117896 A1* | 5/2011 | Soelberg et al. | 455/414.3 |
| 2011/0273981 A1 | 11/2011 | Ktenas et al. | |
| 2011/0305180 A1* | 12/2011 | Osterling | 370/311 |
| 2011/0312359 A1* | 12/2011 | Kolding et al. | 455/509 |
| 2012/0021787 A1 | 1/2012 | Abgrall et al. | |
| 2012/0281616 A1 | 11/2012 | Strinati et al. | |
| 2013/0107776 A1* | 5/2013 | Batchu et al. | 370/311 |
| 2013/0295932 A1* | 11/2013 | Hosobe et al. | 455/435.1 |
| 2014/0016466 A1 | 1/2014 | Strinati et al. | |
| 2014/0219195 A1 | 8/2014 | Strinati et al. | |

OTHER PUBLICATIONS

Antonio De Domenico, et al., "A Survey on MAC Strategies for Cognitive Radio Networks," IEEE Communications Surveys & Tutorials, vol. 14, No. 1, First Quarter 2012, pp. 21-44.

"Dynamic H(e)NB Switching by Means of a Low Power Radio Interface for Energy Savings and Interference Reduction," Telefonica, 3GPP TSG RAN WG3 Meeting, vol. R3-110030, Jan. 17-21, 2011, 5 Pages.

Wolfram Burgard, et al., "Integrating Global Position Estimation and Position Tracking for Mobile Robots: The Dynamic Markov Localization Approach," Intelligent Robots and Systems, vol. 2, Oct. 13-17, 1998, pp. 730-735.

Tao Chen, et al., "Network Energy Saving Technologies for Green Wireless Access Networks", IEEE Wireless Communications, Technologies for Green Radio Communication Networks, vol. 18, No. 5, Oct. 2011, pp. 30-38.

Dieter Ferling, et al., "Final Report on Green Radio Technologies," Earth: Energy Aware Radio and network tecHnologies Earth Project, Deliverable D4.3, https://www.ict-earth.eu/publications/deliverables/deliverables.html, 2012, 121 Pages.

Derrick Wing Kwan Ng, et al., "Energy-Efficient Resource Allocation in OFDMA Systems with Large Numbers of Base Station Antennas", IEEE Transactions on Wireless Communications, vol. 99, 2012, pp. 1-13.

Zhisheng Niu, et al., "Cell Zooming for Cost-Efficient Green Cellular Networks" Energy Efficiency in Communications, IEEE Communications Magazine, vol. 48, No. II, Nov. 2010, pp. 74-79.

Zhisheng Niu, et al., "Energy-Aware Network Planning for Wireless Cellular System with Inter-Cell Cooperation" IEEE Transactions on Wireless Communications, vol. 11, No. 4, Apr. 2012, pp. 1412-1423.

Alberto Conte, et al., "Cell Wilting and Blossoming for Energy Efficiency" IEEE Wireless Communications, vol. 18, No. 5, 2011, pp. 50-57.

French Preliminary Search Report issued Oct. 7, 2013, in French Application No. 13 50947 filed Feb. 4, 2013 (with English Translation of Categories of Cited Documents), 2 pages.

Sofie Pollin, et al., "Meera: Cross-Layer Methodology for Energy Efficient Resource Allocation in Wireless Networks", IEEE Transactions on Wireless Communications, IEEE Service Center, vol. 7, No. 1, Jan. 1, 2008, 12 pages.

* cited by examiner

METHOD FOR MODIFYING THE STATE OF LOCAL ACCESS POINTS IN A CELLULAR NETWORK

TECHNICAL FIELD

The field of the invention is cellular radio communication systems.

The invention is aimed at reducing the global electricity consumption of such a system, and more specifically discloses a method of dynamically modifying the state of system access points as a function of local traffic needs.

STATE OF PRIOR ART

Cellular telecommunication network operators have to face an increasing exponentially amount of data traffic due to the emergence of advanced smartphone type telephones and the introduction of new applications consuming data traffic. The consequence is increased congestion of cells in the access network and therefore a degradation to the quality of service available to network users.

One development to these networks aimed at addressing this congestion problem consists of introducing low power local access points giving a limited radio coverage generally dedicated to residential or company use. Thus the addition of low power local access points covering a small cell such as a microcell (radius less than 2 km), a picocell (with a range of less than 200 m), or a femtocell (range of the order of 10 m) alongside conventional base stations covering a macrocell with a radius typically varying from 2 km to 35 km, provides a means of satisfying this traffic growth.

However, a large number of these local access points has to be deployed due to their very low range. And this deployment can generate a large increase in electricity consumption in the cellular network.

Many cooperative projects such as the European EARTH (Energy Aware Radio and neTwork tecHnologies) project have been set up to put forward network management models capable of improving the energy efficiency by switching off some nodes that form the cellular network or forcing them into standby mode. These models use traffic statistics corresponding to averages of traffic demand in time and space as observed in a given region. However, traffic is inherently very variable and is characterised by large fluctuations in time and in space. Therefore the approach adopted for these models may then lead to having either an over-capacity that affects the energy efficiency of the network, or a spatially and/or temporarily under-capacity that affects the quality of service (QoS) available to users.

Other solutions envisaged to limit the energy consumption consist of dynamically managing base stations or sharing them between different operators. Thus, a technique is known that allow base stations with a low load to interrupt their transmission functions. However, this solution is not satisfactory because it can lead to an excessive degradation of the signal level when a user terminal is connected to several new base stations after the base station with which the terminal was associated is interrupted.

Other techniques aimed at limiting energy consumption are more specifically applicable to low power local access points. Thus, it has been suggested that transmission functions of such a local access point can be dynamically interrupted when traffic is low. Thus, the article "Optimal control of wake up mechanisms of femtocells in heterogeneous networks" by L. Saker et al. IEEE JSAC, Vol. 30, No. 3, April 2012, pp. 664-672, discloses a technique aimed at transferring traffic to be absorbed by a base station covering a macrocell to local access points present in the macrocell each covering a microcell. In general, this technique consists of putting local access points into standby when the load on the macrocell is low and the base station can absorb the traffic while providing users with a satisfactory Quality of Service. On the other hand, one or several local access points are activated when the load increases, as a function of the load and the traffic location. This activation/standby mechanism is controlled centrally by the base station based on information available to the base station about the load requested by each user on each local access point and on the base station, and the location of the traffic.

Although this approach appears interesting, it nevertheless depends on the base station making use of information about the load requested by each user present in the macrocell. Such load information may be relatively difficult to collect because it is an estimate of the future that depends on how resources are allocated to the user, any necessary retransmissions, changes in user traffic over time and therefore the variation of the load on it. The above mentioned article does not address the question of how this load information can be obtained.

It is also a central approach that requires a return channel to send signals and to provide the base station with the information necessary to make the decision and to set up a polling mechanism to control local access points. Other problems related to a central approach are latency and the lack of flexibility of the system.

PRESENTATION OF THE INVENTION

The purpose of the invention is to at least partially overcome the above-mentioned disadvantages related to embodiments according to prior art. In particular, it is aimed at improving the energy efficiency of a cellular network without necessarily degrading the quality of service available to network users, based on a technique similar to that presented in the above-mentioned article, in that it is based on a dynamic modification of transmission functions of local access points.

To achieve this, the invention discloses a method of allocating resources in a cellular radio communication network comprising a plurality of user equipments and a cluster composed of at least one local access point to the network covering a microcell, including the following steps:

for each local access point in the cluster:
determining the presence of user equipments in a coverage zone of the microcell associated with the local access point;
producing a local coverage message specifying equipments determined as present in the microcell coverage zone;
producing a global coverage message by aggregation of the local coverage message of each local access point in the cluster;
modifying at least one operating parameter of at least one local access point in the cluster as a function of the global coverage message;

wherein it comprises, for each local access point in the cluster, the following steps performed for each user equipment specified in the local coverage message:
determine an activity state of the user equipment;
accordingly enter a field in said local coverage message to represent the activity of the equipment.

In using information about the position and the activity state of the user equipment, this method dynamically identifies which users require resources so that some functions of local access points can be activated/deactivated so as to allocate resources locally where users actually need them. Use of activity state information from user equipments based for example on classification of needs in terms of useful load data exchanges and/or signalling data exchanges is also easier to implement than to determine the load actually requested by each user equipment.

This method also has the advantage that it can be implemented in different types of network architecture. It is not limited to a central architecture like the above-mentioned article in which local access points are present in the base station macrocell and are used to transfer traffic to be absorbed by the base station. Rather, it can be implemented without the presence of such a base station (although the invention does cover the case with a base station) and thus includes decentralised architectures in which local access points are for example grouped in clusters (one of the local access points in a cluster or a dedicated equipment being used as coordinator for local access points in the cluster) or distributed architectures in which cooperation between local access points is implemented.

The following is a list of some preferred but non-limitative aspects of the method:
- the activity state of a user equipment is one of the following states:
  - an active state in which the equipment requires exchange of signalling data and useful load data with the network, or
  - a standby state in which the equipment only requires an exchange of signalling data with the network, or
  - an inactive state in which the equipment requires neither an exchange of useful load data nor an exchange of signalling data with the network;
- modification of at least one operating parameter of a local access point in the cluster includes activation, putting in standby or deactivation of the local access point;
- a user equipment is determined as being present in a coverage zone of the microcell associated with a local access point when it is capable of exchanging data with said access point with a given Quality of Service;
- the method is implemented for two coverage zones of the microcell associated with a local access point, namely a first coverage zone for exchange of data with the access point respecting a first Quality of Service and a second coverage zone for exchanging data with the access point respecting a second Quality of Service;
- the first Quality of Service level is a level for exchanging useful load data and the second Quality of Service level is a level for exchanging signalling data;
- the cluster is composed of a single local access point;
- the network comprises a plurality of local access points distributed in at least one cluster of local access points, and the method includes producing a global coverage message for each cluster of local access points, and for each cluster of local access points, modifying of at least one operating parameter of at least one local access point in the cluster, as a function of the corresponding global coverage message;
- said plurality of local access points is present in a macrocell associated with a base station in the network;
- the method also includes, for each local access point, the following steps performed for each user equipment specified in the local coverage message:
  - determining equipment usage context information;
  - accordingly entering a field in said local coverage message representing the usage context.

BRIEF DESCRIPTION OF THE DRAWINGS

Other aspects, purposes, advantages and characteristics of the invention will become clear after reading the following detailed description of preferred embodiments of the invention, given as non-limitative examples with reference to the appended drawings in which.

DETAILED PRESENTATION OF PREFERRED EMBODIMENTS

The invention relates to a method of allocating resources in a cellular radio communication network comprising a plurality of user equipments and a cluster composed of at least one local access point to the network covering a microcell.

A local access point covering a microcell means any low or moderate power equipment providing limited radio coverage, usually dedicated to residential or company use. The term microcell is used to distinguish the local access point conforming with the invention from a conventional base station that itself covers a macrocell. A local access point according to the invention thus covers a microcell with a range typically less than 2 km, and it must be understood that this microcell could also be a picocell, a femtocell or a cell covered by a local radio relay.

A cluster may contain only one local access point. Obviously, it may include a plurality of local access points, for example a subset of local access points present in a macro cell covered by a base station of the network, or all local access points present in the macro cell.

Figure 1:
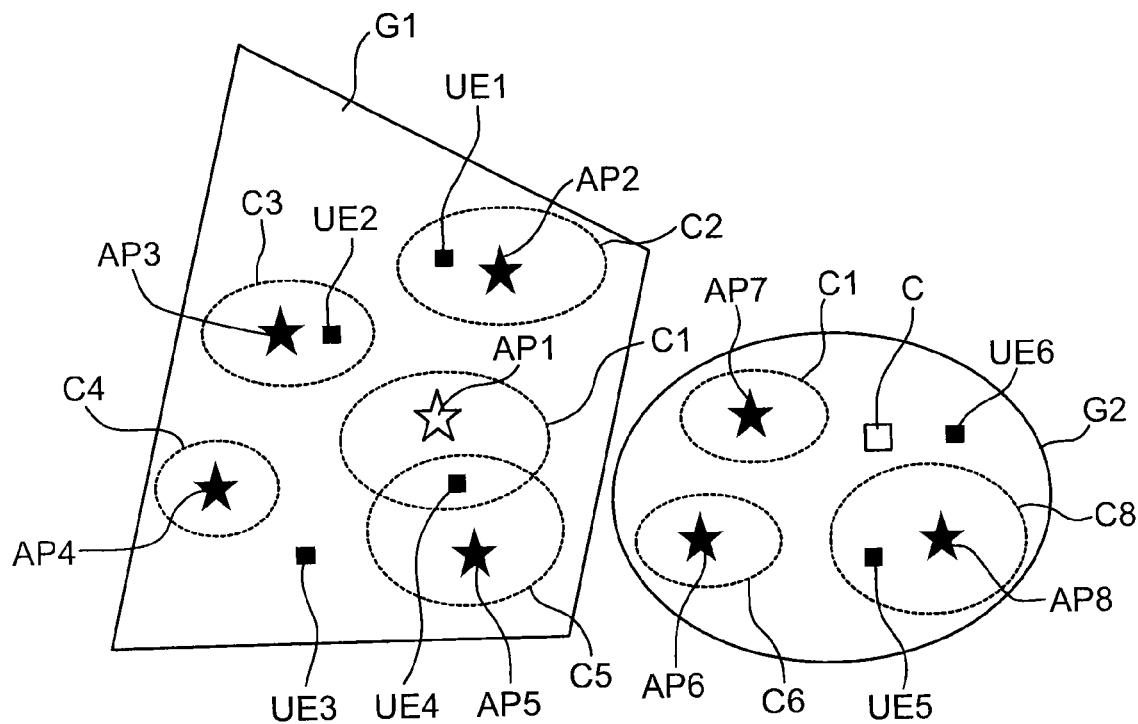
FIG. 1 is a diagram showing a cellular radio communication network comprising several local access points each covering a microcell.

FIG. 1 shows an example of a communication network in which the resources allocation method according to the invention can be implemented. The network comprises several local access points AP1-AP8 each covering a microcell C1-C8, and in which there is a set of user equipment UE1-UE6.

In the example embodiment shown in FIG. 1, local access points AP1-AP8 are distributed into two clusters G1, G2 of local access points. More precisely, local access points AP1-AP5 are found in the first cluster G1, and local access points AP6-AP8 are located in the second cluster. One item of equipment in each of these clusters G1, G2, acts as coordinator: one of the local access points AP1 in the first cluster G1, dedicated equipment C in the second cluster G2.

Determination of the Presence of User Equipments in A Coverage Zone of Local Access Points The method according to the invention comprises a first step aimed at determining the presence of user equipments close to local access points. This step consists more precisely of determining the presence of user equipments T1-T6 in a coverage zone C1-C8 of the microcell associated with the local access point AP1-AP8, for each local access point AP1-AP8. The coverage zone in the example in FIG. 1 corresponds to the entire microcell.

Figure 2:
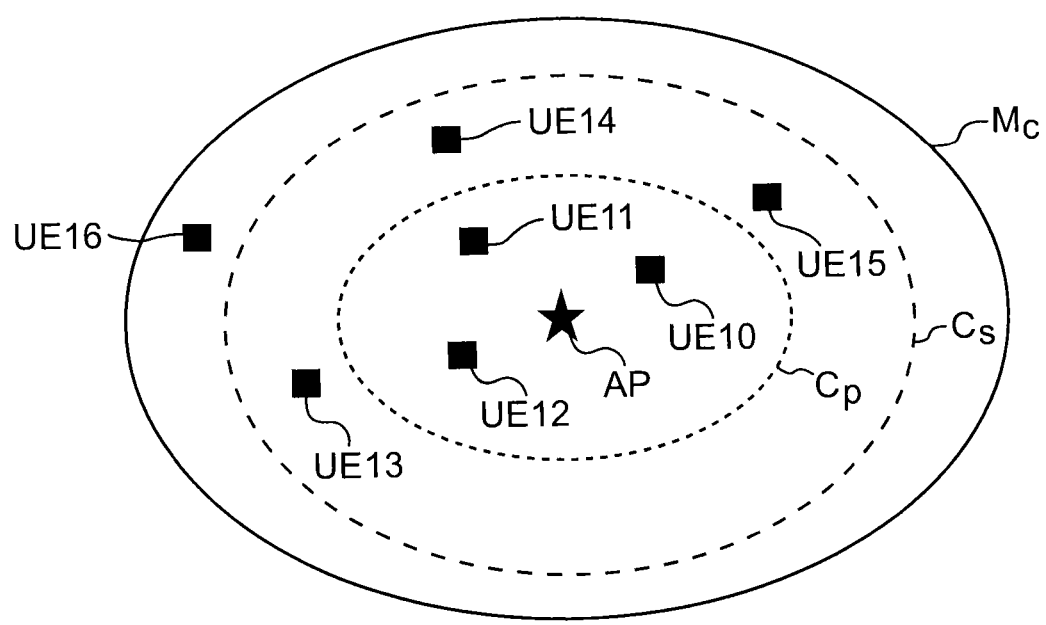
FIG. 2 is a diagram showing a possible embodiment of the invention in which a microcell associated with a local access point has different coverage zones.

With reference to FIG. 2, the invention also extends to include a reduced coverage zone Cp, CS corresponding to only part of the microcell Mc associated with a local access point AP, a reduced coverage zone typically providing a given Quality of Service level that the periphery of the microcell cannot provide for a data exchange between user equipment present in the reduced coverage zone and the local access point.

The invention also includes the definition of several coverage zones within a microcell, these different zones typically providing different Quality of Service levels, for example two coverage zones, one zone Cp of which provides a Quality of Service level for the exchange of useful load data and the other zone Cs provides a Quality of Service level for the exchange of signalling data.

Considering FIG. 1 again, this first step determines the presence of user equipment UE1 in the coverage zone C2 of the local access point AP2, the presence of the user equipment UE2 in the coverage zone C3 of the local access point AP3 and the presence of user equipment UE4 in the corresponding coverage zones C1, C5 of local access points AP1, AP5 respectively, and the presence of user equipment UE5 in the coverage zone C8 of the local access point AP8.

Considering the example shown in FIG. 2, this first step determines the presence of user equipment UE10-UE12 in the coverage zone Cp of the local access point AP and the presence of user equipment UE10-UE15 in the coverage zone Cs of the local access point AP.

This first step may be done in several ways making use of techniques known elsewhere.

In a first variant, this first step to determine a presence in a coverage zone of a local access point is done by the local access point.

This first step may include reception of a message by the local access point indicating the presence of a user equipment in the coverage zone of the local access point. The message may be an explicit user presence message (therefore the user cooperates with the detection mechanism by declaring his presence). It may also be an implicit message for which signal processing operations are used in order to extract information about the presence of user equipment within the coverage zone. A user can also be detected by another nearby user who then transfers this information to the local access point.

Alternately, this first step may include detection of the presence of user equipment in the coverage zone, by the local access point. The local access point may be equipped with an energy detector for this purpose, in order to feel the presence of the user equipment in its surroundings.

In a second variant, this first step may be done by the coordinator of a cluster of local access points such as local access point AP1 for the first cluster G1, and dedicated equipment C for the second cluster G2 in the example in FIG. 2. In a third variant, this first step may be done by a base station covering a macrocell in which the different access points are located. The presence determination mechanisms mentioned above by reception of the presence declaration or by presence detection remain applicable in these variants.

The following embodiments of presence determination may be mentioned as illustrative examples.

According to one embodiment, the first step uses cognitive radio techniques, for example as described in "A Survey on MAC Strategies for Cognitive Radio Networks," by De Domenico, A.; Calvanese Strinati, E.; Di Benedetto, M.-G.; *IEEE Communications Surveys & Tutorials*, vol. 14, no. 1, pp. 21-44, First Quarter 2012.

According to another embodiment, this step makes use of channel quality indicators that are continuously exchanged between active local access points and the user equipments connected to them. A user equipment will be detected as being present in a coverage zone of the local access point if a data exchange can be made with a required service level, which can be determined by calculations making use of channel quality indicators. This makes use of the classical mechanism used to determine if a user is within the coverage range of a cellular base station according to which all base stations periodically transmit pilot messages that are used to enable identification, synchronisation processes, and thus evaluate the quality of the link. For example, a user equipment notifies the base station or its local access point about the link quality observed during the most recent data exchange(s). At the access point, the link adaptation mechanism associated with this link quality, possibly weighted by other information such as the number of retransmissions of the same packet, the interference level, etc., is used to select the appropriate Modulation and Coding Scheme (MCS). This MCS can be used to verify the available quality of service in terms of throughput for the user and thus to detect whether or not he is within a coverage zone associated with the local access point.

According to yet another embodiment, this step makes use of GPS positioning information provided by the user equipment.

According to yet another embodiment, this step uses the fact that user equipment declares its position when it changes its activity state. For example, the user equipment uses a short range radio (for example Bluetooth) to communicate with another user equipment or an access point that has the same radio. This short range radio is usually different from the radio used for information exchange. For further details, refer to R3-110030, "Dynamic H(e)NB Switching by Means of a Low Power Radio Interface for Energy Savings and Interference Reduction," 3GPP TSG RAN WG3 Meeting, Dublin, Ireland, January 2011.

According to yet another embodiment, and as already mentioned above, this step may be implemented by local access points provided with energy detectors to determine the presence of user equipment in their surroundings.

According to yet another embodiment, a coordinator can access a database that contains the position of all access points in the cellular network. The information given by this basic database is then used jointly with presence/position information about the user equipment to determine the coverage zones in which the user equipment is located.

According to yet another embodiment, nearby local access points (for example access points in a single cluster, or access points in radio communication coverage, or geographically nearby access points, etc.) share information collected about the presence (and the activity state as will be seen later) of user equipment within their coverage zone(s), which is advantageous to the extent that user equipments, such as equipment UE4 in FIG. 1, may be located within coverage zone C1, C5 of several local access points AP1, AP5. It is also possible to perform a planned action at a cluster of local access points for which knowledge about the activity state of the population of user equipments may be used by several cooperative resource allocation algorithms.

According to yet another embodiment, this localizing step can make use of mobility models that can predict the future position of user equipments from their previous positions. For example, refer to Burgard, W.; Derr, A.; Fox, D.; Cremers, A. B., "Integrating global position estimation and position tracking for mobile robots: the dynamic Markov localization approach," *Intelligent Robots and Systems,* 1998. *Proceedings.,* 1998 *IEEE/RSJ International Conference on,* vol. 2, no., pp. 730-735 vol. 2, 13-17 Oct 1998.

Note that mobility models can be replaced by an adaptive mechanism such as a Kalman filter, or statistical information can also be used (for example the user's habits such as his trajectory to reach his place of work) and information about the previous position to predict the future position.

Classification of the Activity State of User Equipment

According to a second step, the method according to the invention comprises a step aimed at classifying the user equipments determined as being present in the coverage zone of the microcell associated with a local access point as a function of their activity (these equipments are specified in the local coverage message as will be described in detail below). More precisely, the objective is to discriminate between equipments that do not require network resources and equipments that do require network resources either because they are active or because it might become active.

This second step consists of determining for each local access point, and for each user equipment detected as being present in the coverage zone of the microcell associated with the local access point, an activity state of the user equipment, for example an activity state among the following states:

- an active state in which the equipment requires exchange of signalling data and useful load data (for example files, video on demand or voice) with the network, or
- a standby state in which the equipment only requires exchange of signalling data (for example some paging messages) with the network (the equipment might then become active), or
- an inactive state in which the equipment requires neither a useful load data exchange nor a signalling data exchange with the network.

This classification step may be done in various ways. For example, the following embodiments are possible.

According to one embodiment, this step makes use of a prediction of the activity state of user equipment. For example, user equipments that regularly have a given traffic scheme (for example as detected by sensors) or a given behaviour (as determined by information output from applications that monitor the usage context of the user equipment) may be classified correspondingly.

An example of a given traffic scheme that can be used to construct an activity state prediction model is based on the fact that user equipment is used very repetitively (for example reading a newspaper every morning). This use also depends on the context in which the user is located (for example if he is at work or if he is walking, he will not generate a high load for the network; on the other hand, a large amount of transfer load for video on demand may be generated during a train journey). And for example, a usage context monitoring application may be used to capture a context (for example to detect that the user is viewing a mapping application while he is in the metro) and to predict the activity state.

According to another embodiment, this step uses an activity state timer. Thus for example, user equipments that do not send any data for a long period are classified as being on standby or inactive.

According to another embodiment, this step makes use of pro-activity of user equipment, for example which makes equipment on standby explicitly transfer information about expected traffic, so that its future activity can be estimated. In one variant, a user equipment may be proactive in that it may request that a particular local access point should be activated after using previous information about the Quality of Service. Or a user equipment classified as being on standby or inactive can declare its change of activity explicitly by transmitting a message in a specific slot in the radio frame.

Generation of a Local Coverage Message

The method according to the invention comprises a step consisting of generating, for each local access point, a local coverage message specifying user equipments identified as being present in a coverage zone of the microcell.

In the context of the invention, this step also includes, for each user equipment specified in the local coverage message, entering a field in said local coverage message with data representing the activity of the equipment, as a function of the result of the detection of the activity state (active/on standby/inactive).

Considering the example in FIG. 2, this step provides a first local coverage message dealing with the coverage zone Cp providing a Quality of Service level for the useful load data exchange, containing equipment UE10-UE12 and its corresponding activity state. It also provides a second local coverage message dealing with the coverage zone Cs providing a Quality of Service level for the signalling data exchange, containing equipment UE10-UE15 and its corresponding activity state.

In one variant, the step to classify the activity state of the user equipments present in a coverage zone of a local access point may be accompanied by a step to determine usage context information about said equipments. For each equipment, another field in said local coverage message (field representative of the usage context) may then be entered, as a complement to the field representative of the equipment activity, to provide said information about the usage context. As an illustrative example, the context information may indicate the fact that the equipment is inside or outside a building. The change to operating parameters of local access points can then take account of the fact that the mobility of equipment inside the building is low. The context information may also indicate the fact that the user is in a zone dedicated to entertainment, and that he is then likely to consume multimedia data.

Generation of a Global Coverage Message

The method according to the invention also comprises a step to generate a global coverage message by aggregation of the local coverage message from each local access point belonging to a cluster including at least one local access point.

In a first case, the cluster is composed of a single local access point. It will be understood that the global coverage message is then identical to the local coverage message.

In a second case, the cluster is composed of two or more local access points that exchange their local coverage messages through a radio or a wire link, and each generates the global coverage message and thus has a more complete vision of its environment.

In a third case, the cluster is composed of two or more local access points that return their local coverage messages through a radio or wire link to a cluster coordinator (one of the access points or a dedicated equipment) responsible for generating the global coverage message. In the case in which the cluster is composed of all access points present in a macrocell, the coordinator can then be a controller of the base station associated with the macrocell.

If each local coverage message contains information about the activity state of each equipment present in the coverage zone associated with a local access point (possibly accompanied by context information), this information is also present in the global coverage message (and possibly also the context information).

The previously described steps have been described with reference to local access points. In one possible embodiment of the invention, these previously described steps are also performed for one or several base stations (each covering a macrocell) of the network, for example for a base station in the macrocell of which local access points are present. In such a case, the global coverage message comprises, for each base station (macrocell) and for each local access point (microcell), information about equipments present in the cell (macro or micro) and their activity state (active/on standby/inactive).

Modification to Resources Allocation

In a final step, the method according to the invention modifies at least one operating parameter of at least one local access point, as a function of the global coverage message, in order to improve the energy efficiency of the network.

In the first case mentioned above, local access points act independently of each other and decide themselves whether or not to modify at least one of their operating parameters.

In the second and third cases, the global coverage message is processed centrally by the cluster coordinator or the base station controller, or in a distributed manner by the local access points themselves, so that a common strategy to satisfy user demand can be created by them.

In one particular embodiment, modification of at least one operating parameter of a local access point includes activation, putting on standby or deactivation of the local access point.

In one embodiment, the operating parameter is chosen as a function of a time scale (typically short, medium or long term) over which it is required that the energy efficiency of the network should be improved. The effect of a modification to a f operating parameter on energy efficiency effectively depends on this time scale, particularly to the extent that when such a modification is made, some time has to elapse before another modification can be made. Modification of a operating parameter on a short time scale usually gives better flexibility but consumes more energy than a modification over the long time scale. For example, a local access point may have two standby modes (shallow standby and deep standby). Deep standby consumes less energy than shallow standby, but wakening from a shallow standby only takes a few microseconds while wakening from a deep standby takes significantly longer.

Thus, methods that can improve the energy efficiency of the network include methods that act on a time scale close to the coherence time of the radio channel. In particular, these methods adapt the use of radio resources (antennas, frequency band, power and transmission time) as a function of the network load. For example, refer to:

T. Chen, Y. Yang, H. Zhang, H. Kim, K. Horneman, Network energy saving technologies for green wireless access networks, IEEE Wireless Communications 18 (5) (2011) 30-38;

EARTH, Project Deliverable D4.3, Final Report on Green Radio Technologies, https://www.ict-earth.eu/publications/deliverables/deliverables.html, 2012;

D. Ng, E. Lo, R. Schober, Energy-Efficient Resource Allocation in OFDMA Systems with Large Numbers of Base Station Antennas, IEEE Transactions on Wireless Communications, (99) (2012) 1-13.

Other methods adapt the network to slow changes in the radio load (of the order of hours, days, etc.). The network load profile has a periodic behaviour in which the load is low early in the morning and increases during the day. In general, these methods consist of adapting the number of access points activated in a given region at a given time. For example, refer to:

Z. Niu, Y. Wu, J. Gong, Z. Yang, Cell zooming for cost-efficient green cellular networks, IEEE Communications Magazine 48 (11) (2010) 74-79;

Z. Niu, S. Zhou, Y. Hua, Q. Zhang, D. Cao, Energy-Aware Network Planning for Wireless Cellular System with Inter-Cell Cooperation, IEEE Transactions on Wireless Communications 11 (4) (2012) 1412-1423;

A. Conte, A. Feki, L. Chiaraviglio, D. Ciullo, M. Meo, M. Marsan, Cell wilting and blossoming for energy efficiency, IEEE Wireless Communications 18 (5) (2011) 50-57.

Finally, the network operator can implement methods acting on even longer time scales, following a progressive increase in the demand for radio services. These methods include deployment of new access points, installation of new equipment or acquisition of new frequency bands.

In one embodiment, the cost related to a modification to an operating parameter is evaluated. For example, a cost function can be calculated that takes account of costs related to the impact of this modification on a set of transmission characteristics of the local access point such as a cost related to a reduction in throughput, an increase in delay, an increase in jitter, an increase in the loss of packets, an increase in a transition time between activity states, an increase in the transient energy consumed during such a transition, for example in the form of a weighted sum.

In another embodiment, the benefit related to a modification to an operating parameter on the energy consumption of the system may be evaluated. For example, a benefit function can be calculated corresponding for example to a weighted sum of the gain in energy efficiency for different network components.

The global energy consumption of the cellular network can be reduced according to the invention, so as to locally match the supply and demand of resources, by dynamically modifying the operating state of local access points and make use for this purpose of users positioning information associated with information about the activity state of the user equipments.

More particularly, inactive user equipments are transparent for the network such that mobility management, transmission of reference symbols and random access are not necessary for them. Furthermore, management of mobility of user equipment on standby only requires that coverage messages should be updated, while reference symbols are only transmitted to active user equipment.

Furthermore, in making use of positioning information, the network can force the association of a set of active user equipments with a local access point momentarily considered as being the best candidate, so as to limit the network overload and its electricity consumption, and to limit interference and sources of electromagnetic radiation.

The invention claimed is:

1. A method of allocating resources in a cellular radio communication network comprising a plurality of user equipments and a cluster of at least one local access point to the network covering an associated microcell, the method comprising:

for each local access point in the cluster:
  determining presence of user equipments in a coverage zone of the microcell associated with the local access point;
  determining an activity state of each user equipment determined as present in the microcell coverage zone, the activity state of the user equipment indicating a user equipment requirement for network resources to support data exchange for the user equipment over the network;
  generating a local coverage message specifying any user equipments determined as present in the microcell coverage zone, and entering a field in the local coverage message with data representing the activity state of each user equipment determined as present in the microcell coverage zone;

generating a global coverage message by aggregation of the local coverage message of each local access point in the cluster, whereby the global coverage message comprises user equipments positioning information that specifies, for each local access point in the cluster, the user equipments determined as present in the microcell coverage zone associated with the local access point and user equipments activity information including, for each local access point in the cluster, the data representing the activity state of each user equipment determined as present in the microcell coverage zone associated with the local access point; and modifying at least one operating parameter of at least one local access point in the cluster as a function of the user equipments positioning information and the user equipments activity information in the global coverage message.

2. The method according to claim 1, wherein the activity state is one of the following states:
   an active state in which the user equipment requires exchange of signalling data and useful load data with the network,
   a standby state in which the user equipment only requires an exchange of signalling data with the network, or
   an inactive state in which the user equipment requires neither an exchange of useful load data nor an exchange of signalling data with the network.

3. The method according to claim 1, wherein said modifying the at least one operating parameter of the at least one local access point in the cluster includes activation, putting in standby or deactivation of the at least one local access point.

4. The method according to claim 1, wherein user equipment is determined to be present in the microcell coverage zone associated with the local access point when the user equipment is capable of exchanging data with said local access point with a predetermined Quality of Service level.

5. The method according to claim 1, wherein said method is performed for two coverage zones of the microcell associated with the local access point, namely a first coverage zone for data exchange with the local access point satisfying a first Quality of Service level, and a second coverage zone for data exchange with the local access point satisfying a second Quality of Service level different from the first Quality of Service level.

6. The method according to claim 5, wherein the first Quality of Service level is a level for exchanging useful load data and the second Quality of Service level is a level for exchanging signalling data.

7. The method according to claim 1, wherein the cluster is composed of a single local access point.

8. The method according to claim 1,
   wherein the network comprises a plurality of local access points distributed in at least one cluster of local access points, and
   wherein the method further comprises:
   generating one of said global coverage messages for each cluster of local access points, and
   performing said modifying the at least one operating parameter of at least one local access point of each of the clusters according to the function.

9. The method according to claim 8, wherein said plurality of local access points is present in a macrocell associated with a base station in the network.

10. The method according to claim 1, further comprising, for each local access point, performing the following operations for each user equipment specified in the local coverage message:
    determining equipment usage context information; and
    entering the field in said local coverage message with data representing the determined usage context information.

11. The method according to claim 1, wherein the user equipments activity information consists of, for each local access point in the cluster, the data representing the activity state of each user equipment determined as present in the microcell coverage zone associated with the local access point.

* * * * *